US008429474B2

(12) United States Patent
Yarvis et al.

(10) Patent No.: US 8,429,474 B2
(45) Date of Patent: Apr. 23, 2013

(54) MULTIPLE PROTOCOL DATA TRANSPORT (75) Inventors: Mark D. Yarvis, Portland, OR (US);
Philip A. Muse, Folsom, CA (US);
Lenitra M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 994 days.

(21) Appl. No.: 12/413,767

(22) Filed: Mar. 30, 2009

(65) Prior Publication Data

US 2010/0251052 A1  Sep. 30, 2010

(51) Int. Cl.
*G06F 11/00* (2006.01)

(52) U.S. Cl.
USPC .............................. 714/748; 714/749; 714/751

(58) Field of Classification Search .................. 714/758, 714/799
See application file for complete search history.

(56) References Cited

U.S. PATENT DOCUMENTS

| | | | |
|---|---|---|---|
| 6,590,895 B1 * | 7/2003 | Gupta et al. .................. 370/394 |
| 7,400,248 B2 | 7/2008 | Yarvis | |
| 7,471,633 B2 | 12/2008 | Yarvis et al. | |
| 7,471,668 B2 | 12/2008 | Qin et al. | |
| 2002/0105921 A1 * | 8/2002 | Sawyer et al. ................ 370/328 |
| 2006/0109084 A1 | 5/2006 | Yarvis | |
| 2006/0146712 A1 | 7/2006 | Conner et al. | |
| 2006/0146846 A1 | 7/2006 | Yarvis et al. | |
| 2006/0242316 A1 | 10/2006 | Chhabra et al. | |
| 2006/0268727 A1 | 11/2006 | Rangarajan et al. | |
| 2007/0041351 A1 | 2/2007 | Hazra et al. | |
| 2007/0094723 A1 * | 4/2007 | Short et al. ...................... 726/14 |
| 2007/0233835 A1 | 10/2007 | Kushalnagar et al. | |
| 2007/0250647 A1 * | 10/2007 | Jeon et al. ...................... 709/250 |
| 2008/0049700 A1 | 2/2008 | Shah et al. | |
| 2008/0244089 A1 | 10/2008 | Yarvis et al. | |
| 2009/0222709 A1 * | 9/2009 | Lin et al. ....................... 714/776 |
| 2009/0225775 A1 * | 9/2009 | Wang et al. .................... 370/467 |

OTHER PUBLICATIONS

"RTP Control Protocol," Wikipedia, the free encyclopedia, Feb. 5, 2009, 3 pages.
"Real-Time Transport Protocol," Wikipedia, the free encyclopedia, Mar. 14, 2009, 5 pages.
"H.323," Wikipedia, the free encyclopedia, Mar. 9, 2009, 14 pages.
"InformIT," Pearson Education, Inc. Informit., Mar. 2, 2007, 3 pages.
"msdn," SQL Server 2008 Books Online, Microsoft.com, Microsoft Corporation, 2009, 7 pages.
"Real Time Streaming Protocol," Wikipedia, the free encyclopedia, Mar. 12, 2009, 3 pages.
"File Transfer Protocol," Wikipedia, the free encyclopedia, Mar. 13, 2009, 7 pages.
"Hypertext Transfer Protocol," Wikipedia, the free encyclopedia, Mar. 16, 2009, 7 pages.
"User Datagram Protocol," Wikipedia, the free encyclopedia, Mar. 10, 2009, 6 pages.
"Transmission Control Protocol," Wikipedia, the free encyclopedia, Mar. 14, 2009, 18 pages.

* cited by examiner

*Primary Examiner* — Scott Baderman
*Assistant Examiner* — Sarai Butler
(74) *Attorney, Agent, or Firm* — Barnes & Thornburg, LLP (57) ABSTRACT Methods, media and systems are disclosed in which data is transferred from a data source apparatus to an application of a data receiving apparatus using both a first protocol and a second protocol. The data receiving apparatus identifies data received via the second protocol that has not been received via the first protocol, and delivers the identified data received via the second protocol to the application.

20 Claims, 4 Drawing Sheets

MULTIPLE PROTOCOL DATA TRANSPORT

BACKGROUND

Time-sensitive or real-time data such as video data, audio data, accelerometry data, sensor data (e.g. electrocardiogram data), etc. is typically streamed using an unreliable networking protocol. Unreliable networking protocols assume that error checking and correction are either not necessary or are performed by another layer of the software stack such as the application receiving the data. Thus, data sent via an unreliable networking protocol may arrive out of order, appear duplicated, or go missing without notice. Time-sensitive or real-time applications often use unreliable networking protocols because in such applications data that is lost, missing or discarded is preferable to using data that has arrived late or otherwise delayed. In other applications (e.g. downloading a file) receiving delayed data is preferable to lost, missing or discarded data. As a result, such applications tend to use a reliable networking protocol to ensure data delivery despite incurring additional latency and overhead.

BRIEF DESCRIPTION OF THE DRAWINGS

Embodiments described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. Furthermore, some reference labels may include a superscript and/or subscript to identify a particular item of a group of corresponding or analogous items; but such superscripts and/or subscripts may be omitted to refer to the group of items or a non-specific item of the group.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of disclosed embodiments. However, additional embodiments may be practiced without such specific details of the disclosed embodiments. In other instances, control structures, gate level circuits and full software instruction sequences have not been shown in detail in order not to obscure other aspects of the disclosed embodiments.

References in the specification to "one embodiment", "an embodiment", "an illustrative embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Disclosed embodiments may be implemented in hardware, firmware, software, or any combination thereof. Disclosed embodiments may also be implemented as instructions stored on a machine-readable medium, which may be read and executed by one or more processors. A machine-readable medium may include any mechanism for storing information in a form readable by a machine (e.g., a computing device). For example, a machine-readable medium may include read only memory (ROM); random access memory (RAM); magnetic disk storage media; optical storage media; flash memory devices; and other data storage devices.

Figure 1:
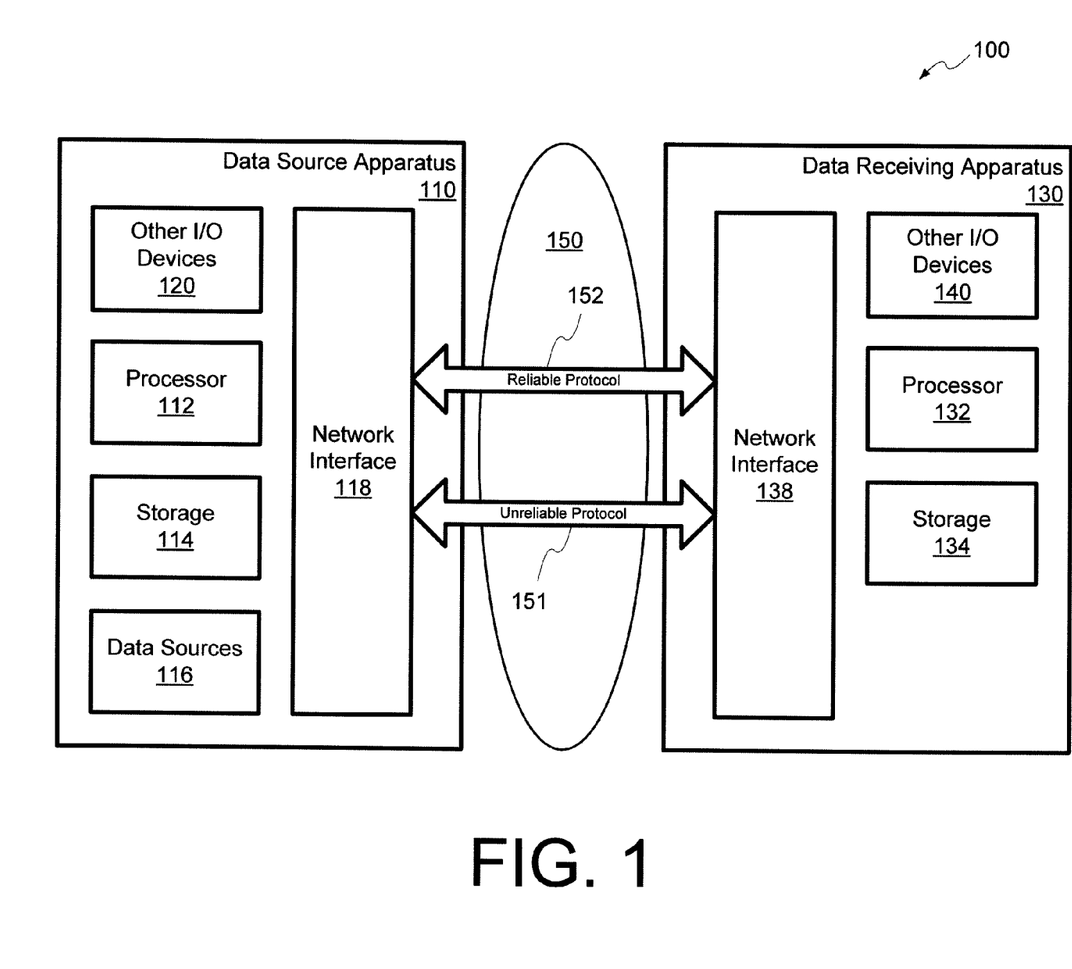
FIG. 1 shows an embodiment of a system for transferring data between a data source apparatus and a data receiving apparatus using multiple protocols.

Referring now to FIG. 1, an embodiment of a system 100 is shown that includes a data source apparatus 110 coupled to a data receiving apparatus 130 via a network 150. In one embodiment, the data source apparatus 110 transmits data over the network 150 to the data receiving apparatus 130 using both an unreliable protocol 151 and a reliable protocol 152. Thus, the data receiving apparatus 130 receives data from the data source apparatus 110 over the network 150 via both the unreliable protocol 151 and the reliable protocol 152.

By transferring data via the reliable protocol 152, the data source apparatus 110 and/or the data receiving apparatus 130 in one embodiment ensures reliable transport of data between the data source apparatus 110 and the data receiving apparatus 130. In particular, reliable transport of data refers to the notion that data transmitted via the reliable protocol 152 eventually arrives at its destination intact or if by chance data is unable to be delivered to the destination the transmitting device is informed that the data was not delivered. For example, data may fail to reach the data receiving apparatus 130 if the data transmitting apparatus 110, the data receiving apparatus 130, or an intermediary link of the network 150 loses connectivity. Other causes may also prevent delivery such as power outages, denial of service attacks, network congestion, etc. However, in properly maintained environments such causes should be exceptional and to the extent such causes prevent delivery of the data, the data source apparatus 110 via the reliable protocol 152 is made aware that the transfer of data has failed.

Per the reliable protocol 152, the data source apparatus 110 and the data receiving apparatus 130 may take various actions in order to maintain reliability, integrity, and ordering of the data being transferred via the reliable protocol 152. For example, the data receiving apparatus 130 may acknowledge successful receipt of data and/or may request retransmission of data not received via the reliable protocol 152. The data source apparatus 110 may generate and transmit checksums and/or error correction codes for data transmitted via the reliable protocol 152. The data receiving apparatus 130 may use such checksums and/or error correction codes to verify and/or correct data received via the reliable protocol 152. In particular, the data receiving apparatus 130 may correct the data using error correction codes if a correctable error is detected. Conversely, the data receiving apparatus 130 may request retransmission of data having a detected uncorrectable error.

Per the reliable protocol 152, the data source apparatus 110 and the data receiving apparatus 130 may further ensure data is delivered to an application of the data receiving apparatus 130 in a specified order such as the order in which the data was transmitted by the data source apparatus 110. In particular, the data source apparatus 110 may transmit data items with associated metadata that identifies a specified order for the data items such as the order in which the data items were transmitted. The data receiving apparatus 130 based upon the received metadata may identify data items that have been received before earlier data items of the specified order. In response to such data items received out of order, the data receiving apparatus 130 per the reliable protocol 152 may store such data items until earlier data items are received and the data items can be delivered to the application in the order specified by the data source apparatus 110. In some embodiments, the data receiving apparatus 130 may discard data items received out of order and request the data source apparatus 110 resend such data items. By requesting retransmission of such data items, the data receiving apparatus 130 may reduce or eliminate storage requirements for out of order data items awaiting receipt of earlier data items before they can be delivered to the application in the specified order.

In one embodiment, the reliable protocol 152 is implemented using the Transmission Control Protocol (TCP) of the Internet Protocol (IP) Suite. In another embodiment, the reliable protocol 152 is implemented using a database replication protocol such as the database replication protocol used by the Microsoft® SQL Server® 2008. However, it should be appreciated that other reliable transport protocols may be used to implement the reliable protocol 152.

While the data source apparatus 110 and data receiving apparatus 130 perform various actions to ensure reliability, integrity and order of data transferred via the reliable protocol 152, the data source apparatus 110 and data receiving apparatus 130 forego such actions when transferring data via the unreliable protocol 151. As such, transferring data items via unreliable protocol 151 may result in the data receiving apparatus 130 receiving data items out of order, receiving duplicates of the same data item, failing to receive some data items transmitted by the data source apparatus 110, and receiving data items having errors. Moreover, per the unreliable protocol 151, the data receiving apparatus 130 may simply discard data received with errors without informing the data source apparatus 110 and without requesting retransmission of such data items. Further, the data receiving apparatus 130 per the unreliable protocol 151 may successfully receive data items without informing the data source apparatus 110 or otherwise acknowledging the receipt of such data items. Accordingly, the data source apparatus 110 per the unreliable protocol 151 in one embodiment is unable to determine whether a particular data item transferred via the unreliable protocol 151 in fact was received by the data receiving apparatus 130. In one embodiment, the data source apparatus 110 and the data receiving apparatus 130 use the User Datagram Protocol (UDP) of the IP Suite for the unreliable protocol 151. However, other unreliable protocols may be used by some embodiments.

An advantage of the unreliable protocol 151 is that it typically incurs lower processing overhead, lower network traffic and lower latency than the reliable protocol 152, but at the expense of some data items not reaching their destination intact or not reaching their destination at all. While data loss may be undesirable or unacceptable for some applications, data loss or missing data may be permissible or even preferable for other applications such as time-sensitive applications and/or real-time applications. For example, a real-time audio/video teleconferencing application has little need for audio and/or video data that arrives late. A real-time audio/video teleconferencing application basically presents audio and video data to users at a receiving end in real time and preferable with minimal delay from when such audio and video data was captured at the transmitting end. A teleconferencing application generally does not wait for data items to be retransmitted or for data items that have been delayed as such waiting generally introduces undesirable lag between transmitting and receiving ends. Moreover, a teleconferencing application generally does not present delayed audio or video data since presentation of such delayed data generally results in a more perceptible glitch in the audio and/or video presentation than simply dropping such delayed data. Thus, applications that can accept lost or missing data items, such as real-time applications and/or time sensitive applications, commonly use an unreliable protocol in order to enjoy lower latency, lower processing overhead, and better network efficiency provided by such protocols in comparison to reliable protocols.

While reliable protocols are desirable for certain applications and unreliable protocols are desirable for other applications, there are still applications for which transmitting data items solely via an unreliable protocol or solely via a reliable protocol is not ideal. For example, applications in which a reliable, low latency protocol is required or desired may not be adequately addressed solely with a reliable protocol or an unreliable protocol. For example, in the realm of telemedicine, the data source apparatus 110 may obtain electrocardiograph signals of a patient and may transfer such electrocardiograph signals to the data receiving apparatus 130 for real-time display at a remote location. In such a telemedicine application, a doctor at the remote site may desire both a real-time display of the electrocardiograph signals and the ability to review the electrocardiograph in more detail at a later time. In order to support such desires, the data source apparatus 110 in one embodiment transmits data items to the data receiving apparatus 130 using both the unreliable protocol 151 and the reliable protocol 152. Transmitting via the unreliable protocol 151 permits real-time, low latency display of the data items at the data receiving apparatus 130. Transmitting via the reliable protocol 152 ensures that the data receiving apparatus 130 receives all the data items representing the electrocardiograph even if one or more data items are delayed. Thus, data items dropped by the unreliable protocol 151 may be replaced by corresponding data items of the reliable protocol 152 to permit a more detailed analysis of the electrocardiograph in a non-real time fashion.

While a telemedicine example has been presented above, the parallel or pseudo parallel transfer of data via the unreliable protocol 151 and the reliable protocol 152 may be useful for a wide range of applications. As such, the data source apparatus 110 and the data receiving apparatus 130 may in practice be implemented by a wide range of network enabled devices. For example, the data source apparatus 110 and data receiving apparatus 130 may correspond to netbook, laptop, desktop, server, or other types of computing platforms. The data source apparatus 110 may also correspond to various types of monitoring equipment such as various types of medical equipment, networking equipment, diagnostic equipment, etc. Similarly, the data receiving apparatus 130 may correspond to various types of presentation equipment such as medical display monitors, diagnostic display monitors, personal data assistants, mobile telephones, etc. which are capable of receiving data via the unreliable protocol 151 and the reliable protocol 152.

Referring further to FIG. 1, hardware aspects of an embodiment of the data source apparatus 110 and the data receiving apparatus 130 are shown. In particular, the data source apparatus 110 may include a processor 112, storage 114, data sources 116, network interface 118 and other I/O devices 120. The processor 112 may be a general purpose processor such as a Core® 2 processor manufactured by Intel Corporation that is capable of executing instructions and controlling operation of the data source apparatus 110 based upon the execution of such instructions. In other embodiments, the processor 112 may comprise other types of processors such as application specific processors and micro-controllers that are operable to control operation of the data source apparatus 110.

The storage 114 may store data and instructions to be processed by the processor 112. Depending upon a given platform, the storage 114 may include various types of storage devices. In particular, the storage 114 may include volatile memory devices such as Synchronous Dynamic Random Access Memory (SDRAM) devices, Dynamic Random Access Memory (DRAM) devices, RAMBUS Dynamic Random Access Memory (RDRAM) devices, and/or other volatile memory devices. Further, the storage 114 may include non-volatile memory devices such as, for example, flash memory devices, read only memory (ROM) devices, Electrical Erasable Programmable ROM (EEPROM) devices, battery backed RAM devices, and/or other non-volatile memory devices. The storage 114 may also include mass storage devices such as floppy disk drives, hard drive disks, compact disk drives, and digital versatile disk (DVD) drives to store data and/or instructions in a non-volatile manner.

The data source apparatus 110 further includes one or more data sources 116 that generate or otherwise provide data items. The data sources 116 may comprise one or more application-specific sources of data and may include software sensing components and/or hardware sensing components. For example, the data sources 116 may include audio libraries, video libraries, audio capture devices such as a microphone, video capture devices such as a camera, and/or various types of sensors that sense or otherwise measure characteristics of their surrounds. For example, the sensors may include various types of biosensors that obtain measurements of biological features of a patient.

Besides providing and/or otherwise generating data items, the data sources 116 in one embodiment may also provide or otherwise associate with each data item metadata that uniquely identifies that data item in a data set. Such metadata may include a session identifier (ID) that identifies a session associated with the sensed data items, a source identifier (ID) that identifies a person, place or thing being sensed, a sensor identifier (ID) that identifies a sensor of the data sources 116 from which the data item originated, a channel identifier (ID) that identifies a channel via which the data item was sensed, a data type, and/or a timestamp that indicates a time at which the data item was sensed.

The network interface 118 operatively couples the data source apparatus 110 to the network 150. As such, the network interface 118 may include one or more network interface controllers, transceivers, and/or antennas that permit transmitting and receiving data over one or more wired and/or wireless links between the data source apparatus 110 and the network 150. In one embodiment, the network interface 118 is coupled to the network 150 via a single wired link such as a CAT 5 networking cable over which the network interface 118 transmits data using the unreliable protocol 151 and the reliable protocol 152. However, in other embodiments, the network interface 118 may be coupled to the network 150 using multiple wired and/or wireless links. Furthermore, the data source apparatus 110 may configure the network interface 118 such that data transmitted via the unreliable protocol 151 uses different links to and/or across the network 150 than data transmitted via the reliable protocol 152.

While depicted as a single entity in FIG. 1, the network 150 may include one or more interconnected and/or separate networks. In particular, the network 150 may implement a heterogeneous network that includes two or more local area networks, wide area networks, cellular networks, or other communication networks. For example, the network 150 may comprise IEEE 802.3 (Ethernet) networks, IEEE 802.11 (Wi-Fi) networks, IEEE 802.16 (WiMAX) networks, Universal Mobile Telecommunications System (UMTS) networks, and/or Global System for Mobile communications (GSM) networks. Due to being comprised of multiple networks, the network 150 in one embodiment may provide multi-path redundancy for the transfer of data items across the network 150. In particular, the network 150 may ensure that data items transferred via the unreliable protocol 151 are routed across a different path of the network 150 than data items transferred via and reliable protocol 152.

Finally, the data source apparatus 110 may include various other I/O devices 120 via which information may be entered into the data source apparatus 110 and/or output from the data source apparatus 110. Such I/O devices 120 may include keyboards, keypads, mice, touch screens, cameras, microphones, video displays, light emitting diodes, printers, etc. While not depicted, the data source apparatus 110 may further include various I/O controllers such as, for example, Parallel AT Attachment (ATA) interface controllers, Serial ATA interface controllers, Small Computer System Interface (SCSI) controllers, graphics controllers, Universal Serial Bus (USB) controllers, Peripheral Component Interconnection (PCI) Express controllers, audio controllers, keyboard controllers and the like in order to controller corresponding devices of the storage 114, data sources 116, network interface 118, and other I/O devices 120.

As shown in FIG. 1, the data receiving apparatus 130 may be implemented in a manner similar to the data source apparatus 110. In particular, the data receiving apparatus 130 may include a processor 132, storage 134, network interface 138, and other I/O device 140. In one embodiment, the processor 132, storage 134, network interface 138 and other I/O devices 140 may be implemented in a manner similar to corresponding components of the data source apparatus 110.

Figure 2:
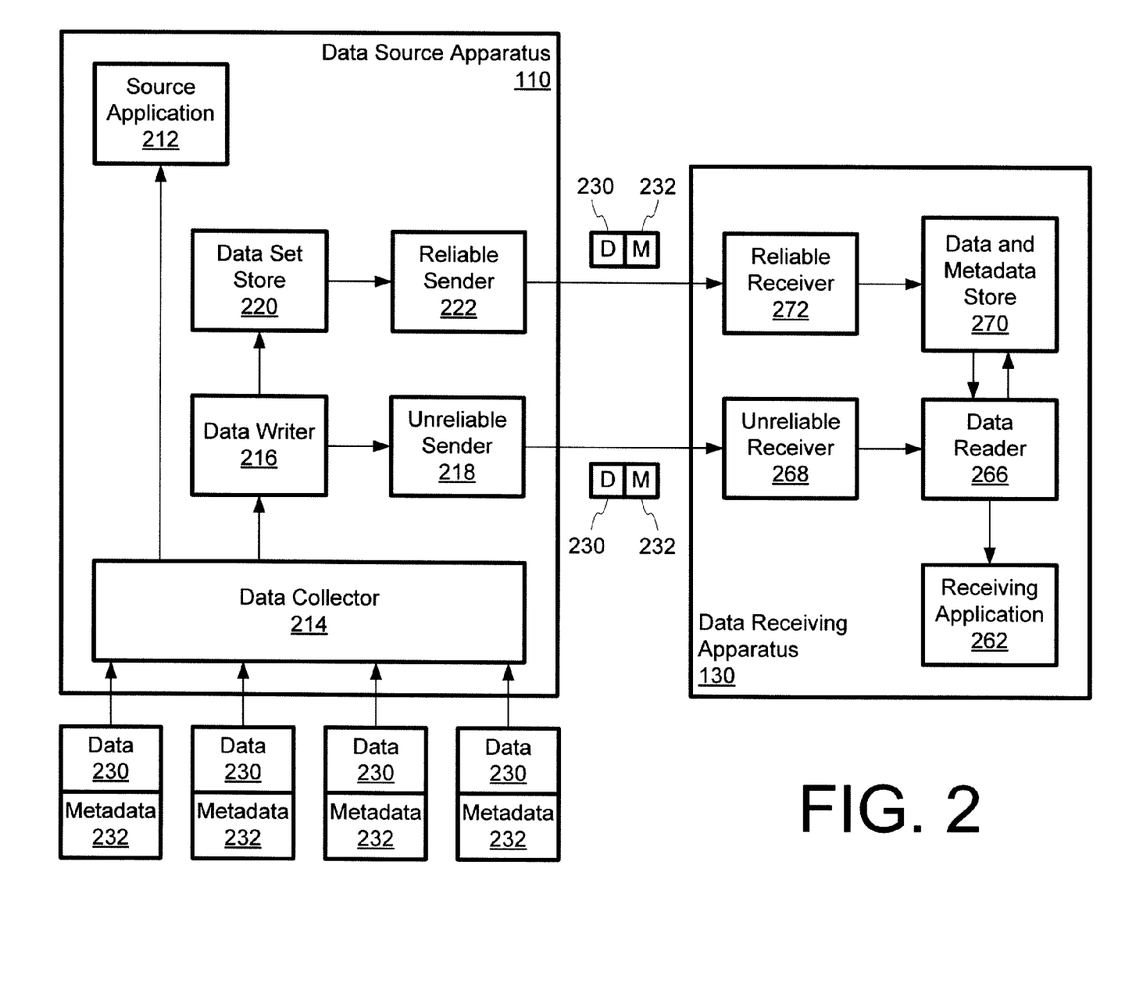
FIG. 2 shows functional blocks of an embodiment of the system of FIG. 1.

Referring now to FIG. 2, a software and data flow diagram of an embodiment of the system 100 is shown. As shown, the data receiving apparatus 110 may include a source application 212, a data collector 214, a data writer 216, an unreliable sender 218, data set store 220, and a reliable sender 222. In one embodiment, the source application 212, the data collector 214, the data writer 216, the unreliable sender 218, and the reliable sender 222 are implemented via firmware and/or software executed by the data source apparatus 110. However, it should be appreciated that one or more of the illustrated blocks of FIG. 2 may be implemented and/or partially implemented using various hardware components.

As shown, the data receiving apparatus 130 may include a receiving application 262, a data reader 266, an unreliable receiver 268, a data and metadata store 270, and a reliable receiver 272. In one embodiment, the receiving application 262, the data reader 266, the unreliable receiver 268, and the reliable receiver 272 are implemented via firmware and/or software executed by the data receiving apparatus 130. However, it should be appreciated that one or more of the illustrated blocks of FIG. 2 may be implemented and/or partially implemented using various hardware components.

The source application 212 provides a server or service that is responsible for handling data received by the data collector 214 and potentially presenting such data locally via an I/O device 120 of the data source application 110. For example, if the data source apparatus 110 implements an electrocardiograph machine, then the source application 212 may permit a technician to control or otherwise calibrate the electrocardiograph machine via a user interface of the I/O devices 120. Further, the source application 212 may generate and display electrocardiograph data on a video monitor of the I/O device 120. Besides the local handling of the data items 230, the source application 212 may further control the data writer 216, unreliable sender 218, and reliable sender 222 in order to control the transfer of the collected data to the receiving application 262 of the data receiving apparatus 130.

In support of such functions, the data collector 214 receives data items 230 and associated metadata 232 from data sources 116. The data collector 214 further provides the collected data items 230 and associated metadata 232 to the source application 212 and the data writer 216. The data writer 216 receives the data items 230 and associated metadata 232 from the data collector 214. The data writer 216 stores the received data items 230 and associated metadata 232 in a data set store 220 of the data source apparatus 110. In one embodiment, the data source apparatus 110 implements the data set store 220 as one or more data structures in memory devices of the storage 114. As such, the data writer 216 updates such data structures to account for the received data items 230 and associated metadata 232. In another embodiment, the data source apparatus 110 implements the data set store 220 as one or more database tables in a database storage device of the storage 114. In such an embodiment, the data writer 216 updates such database tables to account for the data items 230 and associated metadata 232.

The data writer 216 further provides the data items 230 and associated metadata 232 to the unreliable sender 218 in the order in which the data items 230 were generated by the data sources 116 shown in FIG. 1. In one embodiment, the data sources 116 provide generated data items 230 with metadata 232 that includes a timestamp that identifies the time at which an associated data item 230 was generated. As such, the data writer 216 may use such timestamps in order to present the data items 230 to the unreliable sender 218 in the order in which they were generated.

The unreliable sender 218 in turn transfers the data items 230 and associated metadata 232 to the unreliable receiver 268 of the data receiving apparatus 130 via the unreliable protocol 151. Moreover, the reliable sender 222 transfers data items 230 and associated metadata 232 to the reliable receiver 272 via the reliable protocol 152. In one embodiment, the reliable sender 222 uses the timestamps associated with the data items 230 to transfer the data items 230 via the reliable protocol 152 in the order in which the data items 230 were generated.

The unreliable receiver 268 of the data receiving apparatus 130 receives data items 230 and associated metadata 232 from the unreliable sender 218 via the unreliable protocol 151. Moreover, the unreliable receiver 268 of the data receiving apparatus 130 provides the data reader 266 with successfully received data items 230 and their associated metadata 232. As explained above in regard to unreliable protocols, the unreliable receiver 268 per the unreliable protocol 151 foregoes actions of the reliable protocol 152 associated with ensuring reliability, integrity and order. As a result, the unreliable receiver 268 may receive data items 230 in an order that differs from the order in which the data items 230 were generated by the data sources 116 and may transfer the data items 230 and associated metadata 232 to the data reader 266 in the order in which the data items 230 and the associated metadata 232 were received by the unreliable receiver 268.

The reliable receiver 272 of the data receiving apparatus 130 similarly receives data items 230 and associated metadata 232 from the reliable sender 222 via the reliable protocol 152. In one embodiment, the data receiving apparatus 130 implements the data and metadata store 270 as one or more data structures stored in memory devices of the storage 134. Accordingly, the reliable receiver 272 in such an embodiment updates the data structures of the data and metadata store 270 to account for the data items 230 and associated metadata 232 received via the reliable protocol 152. In another embodiment, the data and metadata store 270 are implemented as one or more database tables of a database storage device of the storage 134. The reliable receiver 272 in such an embodiment updates the tables of the database storage device to account for the received data items 230 and associated metadata 232.

As explained above in regard to reliable protocols, the reliable receiver 272 per the reliable protocol 152 performs actions that ensure reliability, integrity and order. As a result, while the reliable receiver 272 may receive data items 230 in an order that differs from the order in which the data items 230 were generated by the data sources 116, the reliable receiver 272 ensures that the data items 230 and associated metadata 232 are transferred to data and metadata store 270 in the order in which the data items 230 were generated by the data sources 116.

The data reader 266 may receive data items 230 and associated metadata 232 from the unreliable receiver 268 and transfer such received data items 230 and associated metadata 232 to the receiving application 262. The data reader 266 may further update the data structures of the data and metadata store 270 to account for the data items 230 and associated metadata 232 received via the unreliable protocol 151. As explained in more detail below in regard to FIGS. 3 and 4, the data reader 266 may further deliver data items 230 and associated metadata 232 to the receiving application 262 that were received via the reliable receiver 272 but have not been received by the unreliable receiver 268.

In one embodiment, data received via the unreliable receiver 268 may be delivered to the receiving application 262 out of order. Accordingly, the receiving application 262 in one embodiment is implemented to handle receipt of data items 230 out of order. For example, in an embodiment in which the receiving application 262 is a monitoring application, the receiving application 262 may provide a scrolling display of incoming data items 230. The receiving application 262 may further generate the display such that gaps appear whenever data is lost or otherwise discarded by the unreliable protocol 151. The receiving application 262 may then fill in these gaps with data items 230 that are eventually received via the reliable protocol 152. In some embodiments, the application may be unaware of whether data items 230 and associated metadata 232 were received via the reliable protocol 152 or unreliable protocol 151.

Figure 3:
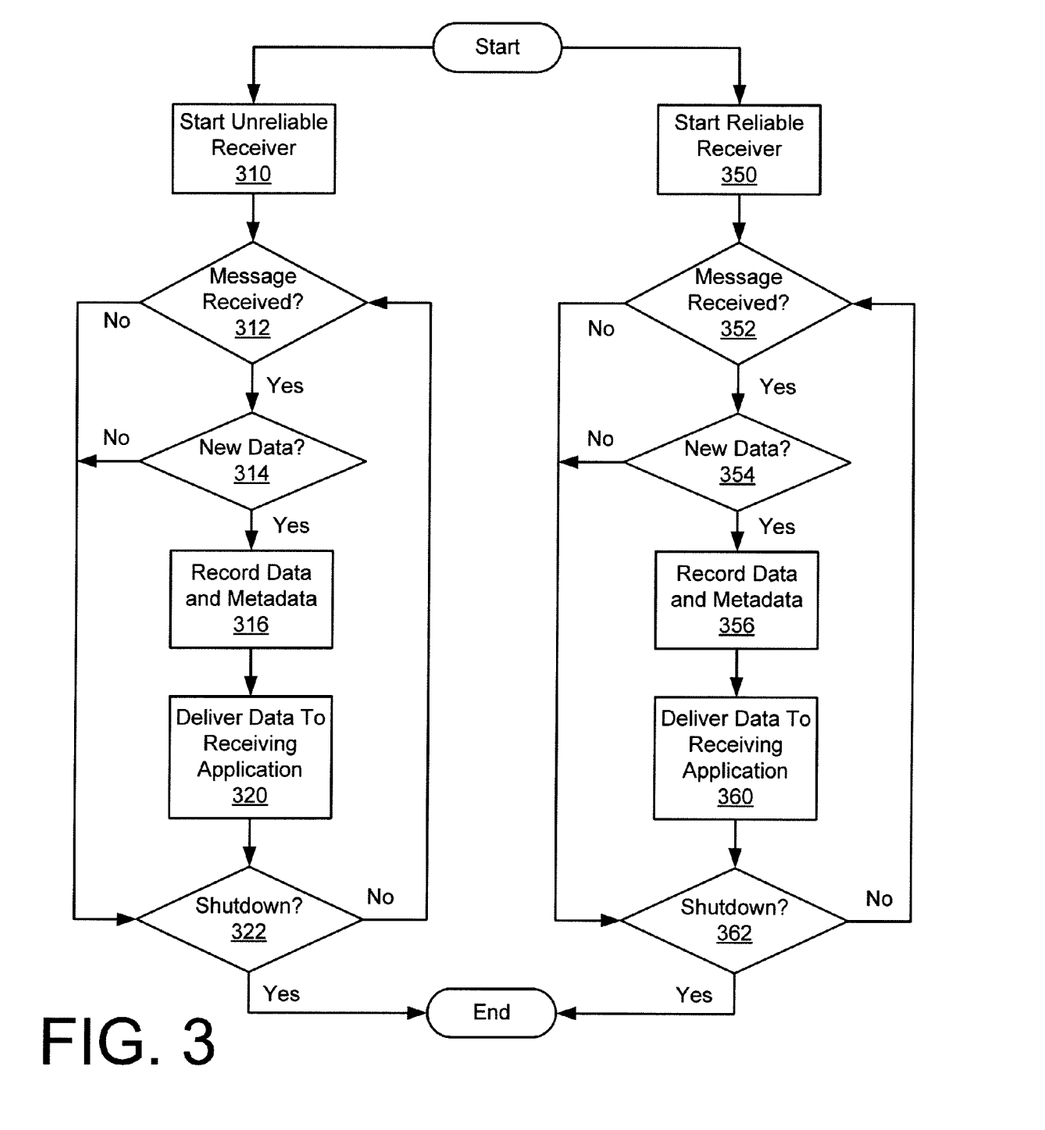
FIG. 3 shows an embodiment of a method for receiving data that may be implemented by the data receiving apparatus of FIG. 1.

Referring now to FIG. 3, additional details regarding a method for receiving data using both reliable and unreliable protocols is depicted. In one embodiment, the method is implemented with an unreliable receiving process or thread and a separate reliable receiving process or thread. Such an implementation enables the data receiving apparatus 130 to process incoming messages via the unreliable protocol 151 and incoming messages via the reliable protocol 152 in a parallel or pseudo parallel manner. Despite the parallel nature of the unreliable and reliable receiving of messages, the following first describes the operation of the unreliable receiving process and then the reliable receiving process in order to simplify the description.

As shown, the data receiving apparatus 130 at block 310 may start the unreliable receiving process. In one embodiment, the unreliable receiving process implements the unreliable receiver 268 and a portion of the data reader 266. However, it should be appreciated that in other embodiments the unreliable receiver 268 and the data reader 266 may be implemented as separate processes. At block 312, the unreliable receiver 268 may determine whether a message has been received via the unreliable protocol 151. If a message has not been received, then the unreliable receiving process at block 322 may determine whether to stop processing incoming messages. For example, the receiving application 262 or an underlying operating system of the data receiving apparatus 130 may request the unreliable receiving process to shutdown or otherwise terminate execution. If the unreliable receiving process determines not to shutdown, then the unreliable receiving process may return to block 312 to permit the unreliable receiver 268 to check for a message from the network 150. Otherwise, the unreliable receiving process proceeds with the shutdown.

If at block 312, the unreliable receiver 268 determines that a message has been received via the unreliable protocol 151, then the unreliable receiver 268 presents the data items 230 and associated metadata 232 to the data reader 266. At block 314, the data reader 266 determines whether the message includes data items 230 that have not been previously received. In one embodiment, the data reader 266 determines whether data items 230 of the message are new data items by analyzing metadata 232 associated with the data items 230 and metadata 232 of the data and metadata store 270 which records metadata 232 of previously received data items 230. If the data reader 266 determines that the data items 230 of the message are not new, then the unreliable receiving process proceeds to block 322 to determine whether to shutdown.

If the data reader 266 determines that the data items 230 of the message have not been previously received, then the data reader 266 at block 316 records the data items 230 and associated metadata 232 in the data and metadata store. In particular, the data reader 266 may update data structures of the data and metadata store 270 to account for the newly received data items 230 and associated metadata 232. At block 320, the data reader 266 further provides the newly received data items 230 and associated metadata 232 to the receiving application 262. The unreliable receiving process may again determine at block 322 whether to shutdown. If the unreliable receiving process determines not to shutdown, then the unreliable receiving process may return to block 312 in order to permit the unreliable receiver 268 to receive additional messages via the unreliable protocol 151.

The reliable receiving process operates in a similar manner as the unreliable receiving process. In particular, the data receiving apparatus 130 at block 350 may start the reliable receiving process. In one embodiment, the reliable receiving process implements the reliable receiver 272 and a portion of the data reader 266. However, it should be appreciated that in other embodiments the reliable receiver 272 and the data reader 266 may be implemented as separate processes. At block 352, the reliable receiver 272 may determine whether a message has been received via the reliable protocol 152. If a message has not been received, then the reliable receiver 272 at block 362 may determine whether to stop processing incoming messages. If the reliable receiver 272 determines not to shutdown, then the reliable receiver 272 may return to block 352 and check for a message from the network 150. Otherwise, the reliable receiver 272 proceeds with the shutdown.

If at block 352, the reliable receiver 272 determines that a message has been received via the reliable protocol 152, then the reliable receiver 272 determines at block 354 whether the message includes data items 230 that have not been previously received. In one embodiment, the reliable receiver 272 determines whether data items 230 of the message are new data items by analyzing metadata 232 associated with the data items 230 and metadata 232 of the data and metadata store 270 which records metadata 232 of previously received data items 230. If the reliable receiver 272 determines that the data items 230 of the message are not new, then the reliable receiving process proceeds to block 362 to determine whether to shutdown.

If the reliable receiver 272 determines that the data items 230 of the message have not been previously received, then the reliable receiver 272 at block 356 records the data items 230 and associated metadata 232 in the data and metadata store 270. In particular, the reliable receiver 272 may update data structures of the data and metadata store 270 to account for the newly received data items 230 and associated metadata 232. At block 360, the data reader 266 may identify the newly received data items 230 of the data and metadata store 270 and may provide such newly received data items 230 and associated metadata 232 to the receiving application 262. The reliable receiving process again determines at block 362 whether to shutdown. If the reliable receiving process determines not to shutdown, then the reliable receiving process may return to block 352 in order to permit the reliable receiver 272 to receive additional messages via the reliable protocol 152.

Figure 4:
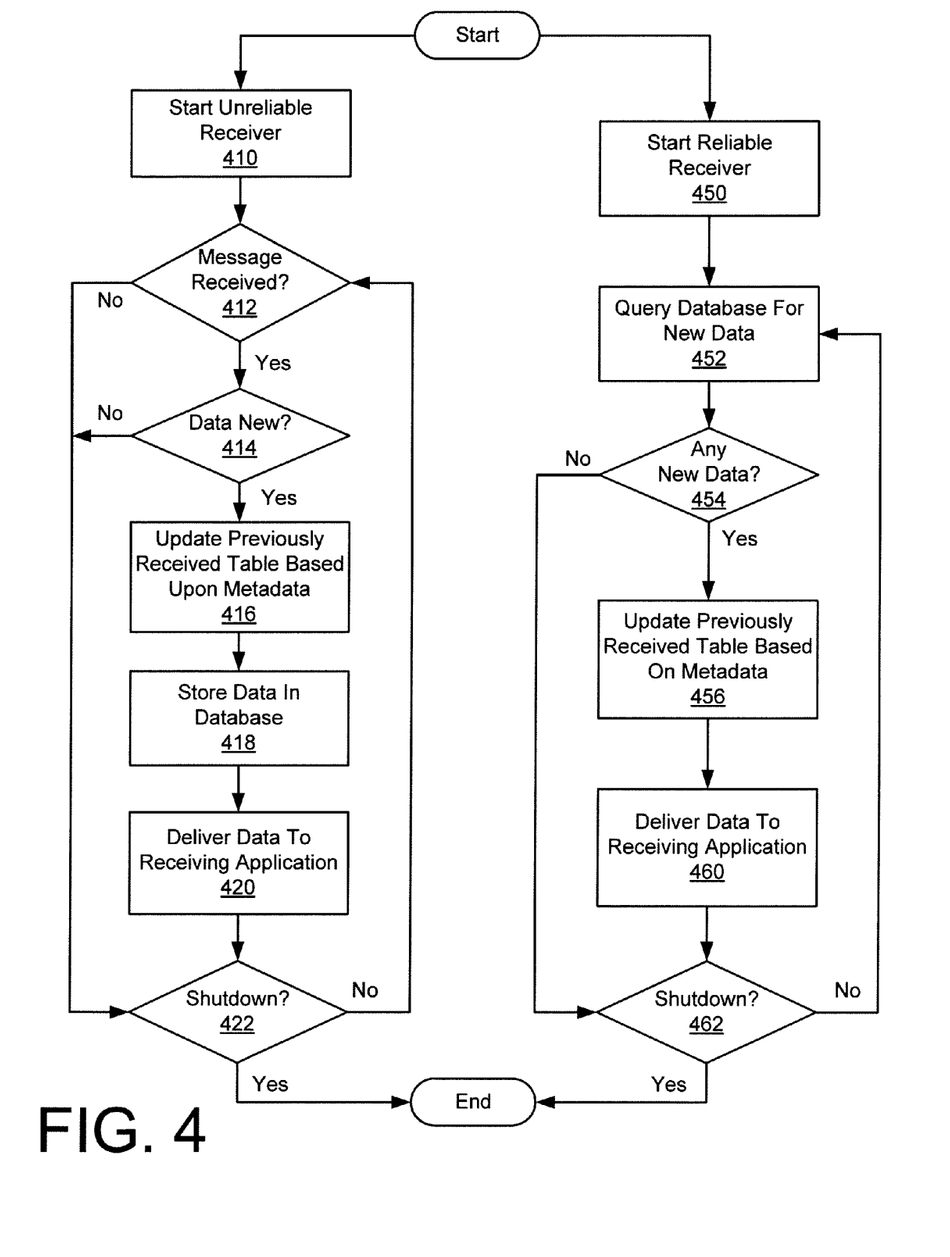
FIG. 4 shows another embodiment of a method for receiving data that may be implemented by the data receiving apparatus of FIG. 1.

Referring now to FIG. 4, details regarding another method for receiving data using both reliable and unreliable protocols is depicted. Aspects of the method of FIG. 4 are similar to aspects of the method of FIG. 3. However, the method of FIG. 4 utilizes a database replication protocol as the reliable protocol 152 in order to reliable transfer data items 230 from a database of the data set store 220 to a database of the data and metadata store 270.

As shown, the data receiving apparatus 130 at block 410 may start the unreliable receiving process. At block 412, the unreliable receiver 268 may determine whether a message has been received via the unreliable protocol 151. If a message has not been received, then the unreliable receiving process at block 422 may determine whether to stop processing incoming messages. If the unreliable receiving process determines not to shutdown, then the unreliable receiving process may return to block 412 to permit the unreliable receiver 268 to check for a message from the network 150. Otherwise, the unreliable receiving process proceeds with the shutdown.

If at block 412, the unreliable receiver 268 determines that a message has been received via the unreliable protocol 151, then the unreliable receiver 268 presents the data items 230 and associated metadata 232 to the data reader 266. At block 414, the data reader 266 determines whether the message includes data items 230 that have not been previously received. In one embodiment, the data reader 266 determines whether data items 230 of the message are new data items by analyzing a previously received database table of the data and metadata store 270. The previously received database table records metadata 232 of previously received data items 230.

If the data reader 266 determines that the data items 230 of the message are not new, then the unreliable receiving process proceeds to block 422 to determine whether to shutdown.

If the data reader 266 determines that the data items 230 of the message have not been previously received, then the data reader 266 at block 416 updates the previously received database table based upon the associated metadata 232 for the data items 230 to account for the received data items 230. The data reader 266 further stores the data items 230 in a database of the data and metadata store 270 to record such data items 230 for future access. In some embodiments, storing the received data items 230 in the database may eliminate the need for the reliable sender 222 to later replicate those specific data items to the reliable receiver 272. At block 420, the data reader 266 further provides the newly received data items 230 and associated metadata 232 to the receiving application 262. The unreliable receiving process may again determine at block 422 whether to shutdown. If the unreliable receiving process determines not to shutdown, then the unreliable receiving process may return to block 412 in order to permit the unreliable receiver 268 to receive additional messages via the unreliable protocol 151.

The reliable receiving process operates in a manner that is somewhat different from the unreliable receiving process. In a separate thread (not pictured), the data receiving apparatus 130 or the data source apparatus 110 may periodically reconcile differences between the data set store 220 in the data source apparatus 110 and the data and metadata store 270 in the data receiving apparatus 130, in some cases causing new data to be replicated to the data and metadata store 270. In another thread, the data receiving apparatus 130 at block 450 may start the reliable receiving process. At block 452, the reliable receiver 272 queries the data and metadata store 270 of the data receiving apparatus 130 via a database query interface for data items that were not previously received by the data reader 266. At block 454, the reliable receiver 272 determines whether the database query resulted in any new data items 230 being obtained. If the reliable receiver 272 determines that new data items 230 were received as a result of the database query, then the reliable receiver 272 at block 456 updates the previously received database table based upon the associated metadata 232 for the newly received data items 230 in order to account for the received data items 230.

At block 460, the data reader 266 may identify any newly stored data items 230 based upon associated metadata 232 and may provide such new data items 230 and associated metadata 232 to the receiving application 262. The reliable receiving process again determines at block 462 whether to shutdown. If the reliable receiving process determines not to shutdown, then the reliable receiving process may return to block 452 in order to permit the reliable receiver 272 to query the database of the data source apparatus 110 for new data items.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

What is claimed is:

1. A method comprising
receiving a first data subset of a data set via a first protocol,
receiving a second data subset of the data set via a second protocol contemporaneously with the first data subset received via the first protocol, wherein the second data subset includes at least one data item of the first data subset,
identifying data items of the first data subset that have not been previously received as data items of the second data subset via the second protocol,
delivering the not previously received data items of the first data subset to an application,
identifying data items of the second data subset that have not been previously received as data items of the first data subset via the first protocol, and
delivering the not previously received data items of the second data subset to the application.

2. The method of claim 1 further comprising
receiving first metadata via the first protocol that uniquely identifies each data item of the first data subset of the data set, and
receiving second metadata via the second protocol that uniquely identifies each data item of the second data subset of the data set, wherein
identifying the not previously received data items of the first data subset and the second data subset comprises identifying the not previously received data items of the first data subset and the second data subset based upon the first metadata and the second metadata.

3. The method of claim 1 further comprising
receiving first metadata via the first protocol that uniquely identifies each data item of the first data subset of the data set,
updating a data structure based upon the first metadata in response to receiving the first data subset to indicate receipt of the first data subset,
receiving second metadata via the second protocol that uniquely identifies each data item of the second data subset of the data set,
updating the data structure based upon the second metadata in response to receiving the second data subset to indicate receipt of the second data subset, and
identifying the not previously received data items of the first data subset and the second data subset based upon contents of the data structure.

4. The method of claim 1 wherein
the first protocol is implemented with an unreliable protocol, and
the second protocol is implemented with a reliable protocol.

5. The method of claim 1 wherein
receiving the first data subset via the first protocol includes successfully receiving the first data subset without acknowledging successful receipt of the first data subset, and
receiving the second data subset via the second protocol includes acknowledging successful receipt of the second data subset.

6. The method of claim 1 wherein
receiving the first data subset via the first protocol includes detecting uncorrectable errors of data items received via the first protocol, and discarding the data items received via the first protocol that have uncorrectable errors without requesting retransmission, and
receiving the second data subset via the second protocol includes detecting uncorrectable errors of data items received via the second protocol, and requesting retransmission of the data items with detected uncorrectable errors.

7. The method of claim 1 wherein
- receiving the first data subset via the first protocol includes receiving the first data subset without informing a sender of the first data subset that a data item transmitted via the first protocol was not received, and
- receiving the second data subset via the second protocol includes informing a sender of the second data subset that a data item of the second data subset transmitted via the second protocol was not received.

8. The method of claim 1 wherein
- receiving the first data subset via the first protocol includes receiving the first data subset via the first protocol in a first receipt order that is different than a first transmission order in which the first data subset was transmitted via the first protocol,
- receiving the second data subset via the second protocol includes receiving the second data subset via the second protocol in a second receipt order that is different than a second transmission order in which the second data subset was transmitted via the second protocol, and
- delivering the not previously received data items of the first data subset and the second data subset includes delivering the first data subset to the application in the first receipt order, and delivering the second data subset to the application in the second transmission order.

9. A non-transitory, machine readable medium comprising a plurality of instructions that in response to being executed result in a computing apparatus
- receiving a first data subset of a data set via a first protocol,
- delivering the first data subset received via the first protocol to an application,
- receiving a second data subset of the data set via a second protocol contemporaneously with the first data subset received via the first protocol, wherein the second data subset includes at least one data item of the first data subset,
- identifying data items of the second data subset that have not been received as data items of the first data subset via the first protocol, and
- delivering the identified data items to the application.

10. The machine readable medium of claim 9 wherein the plurality of instructions further result in the computing apparatus
- receiving first metadata via the first protocol that uniquely identifies each data item of the first data subset of the data set, and
- identifying the data items of the second data subset based upon the first metadata for the first data subset.

11. The machine readable medium of claim 9 wherein the plurality of instructions further result in the computing apparatus
- receiving first metadata via the first protocol that uniquely identifies each data item of the first data subset of the data set,
- storing the first metadata and the first data subset in a database, and
- identifying the data items of the second data subset based upon contents of the database.

12. The machine readable medium of claim 9 wherein the plurality of instructions further result in the computing apparatus
- receiving first metadata via the first protocol that uniquely identifies each data item of the first data subset of the data set,
- receiving second metadata via the second protocol that uniquely identifies each data item of the second data subset of the data set,
- storing the first metadata, the second metadata, the first data subset and the second data subset in a database, and
- identifying additional data items of the data set that have not been received based upon contents of the database.

13. The machine readable medium of claim 9 wherein the plurality of instructions further result in the computing apparatus
- receiving the first data subset per a User Datagram Protocol (UDP), and
- receiving the second data subset per a database replication protocol.

14. The machine readable medium of claim 9 wherein the plurality of instructions further result in the computing apparatus
- receiving the first data subset per an unreliable networking protocol, and
- receiving the second data subset per a reliable networking protocol.

15. A system comprising
- a data source hardware apparatus to transmit a data set via a first protocol and to transmit the data set via a second protocol contemporaneously with the first protocol, and
- a data receiving hardware apparatus to receive a first data subset from the data set via the first protocol and to receive a second data subset from the data set contemporaneously via the second protocol, to deliver the first data subset received via the first protocol to an application, to identify data received via the second protocol that has not been received via the first protocol, and to deliver the identified data received via the second protocol to the application, wherein the second data subset includes at least one data item of the first data subset.

16. The system of claim 15, further comprising one or more sensors coupled to the data source hardware apparatus, wherein the data source hardware apparatus streams data generated by the one or more sensors in real time via the first protocol and transmits the data generated by the one or more sensors in non-real time via the second protocol.

17. The system of claim 16, further comprising
- a first database to which the data source hardware apparatus stores the data generated by the one or more sensors, and
- a second database to which the data receiving hardware apparatus stores data received via the first protocol and the second protocol, wherein
- the first protocol comprises an unreliable networking protocol,
- the second protocol comprises a database replication protocol, and
- the unreliable protocol causes the data source hardware apparatus to not retransmit data that was transmitted via the unreliable networking protocol of the first protocol but not received by the data receiving hardware apparatus, and
- the database replication protocol causes the data source hardware apparatus to retransmit data that was transmitted via the database replication protocol but not received by the data receiving hardware apparatus.

18. The system of claim 15, wherein the data source hardware apparatus is to retransmit data sent via the second protocol but not received by the data receiving hardware apparatus and not to retransmit data sent via the first protocol but not received by the data receiving hardware apparatus.

19. The system of claim 15, wherein
- the data source hardware apparatus comprises a processor, storage and at least one network interface that cooperate to transmit data to the data receiving hardware apparatus via the first protocol and the second protocol, and the data receiving hardware apparatus comprises a processor, storage and at least one network interface that cooperate to receive data via the first protocol and the second protocol and to deliver data received via the first protocol to the application.

20. The system of claim 15, wherein the application is unaware of whether incoming data items were received via the first protocol or via the second protocol.

\* \* \* \* \*